United States Patent [19]

Hagerty et al.

[11] Patent Number: 5,693,583

[45] Date of Patent: Dec. 2, 1997

[54] HIGH ACTIVITY POLYETHYLENE CATALYSTS WHICH PRODUCE BIMODAL OR TRIMODAL PRODUCT MOLECULAR WEIGHT DISTRIBUTIONS

[75] Inventors: Robert O. Hagerty, Metuchen; Per K. Husby, Somerset; Yury V. Kissin, East Brunswick; Robert I. Mink, Warren; Thomas E. Nowlin, West Windsor, all of N.J.

[73] Assignee: Mobil Oil Corporation, Fairfax, Va.

[21] Appl. No.: 799,086

[22] Filed: Feb. 11, 1997

Related U.S. Application Data

[63] Continuation of Ser. No. 335,624, Nov. 8, 1994, abandoned, which is a continuation-in-part of Ser. No. 121,821, Sep. 15, 1993, abandoned, which is a continuation-in-part of Ser. No. 8,854, Jan. 25, 1993, abandoned, which is a continuation of Ser. No. 712,298, Jun. 10, 1991, abandoned.

[30] Foreign Application Priority Data

Jun. 9, 1992 [EP] European Pat. Off. ............ 92305256.7
Jun. 10, 1992 [AU] Australia .................. 18134/92

[51] Int. Cl.$^6$ .............................. B01J 31/00; B01J 37/00; C08F 4/02; C08F 4/60
[52] U.S. Cl. .................. 502/115; 502/104; 502/116; 502/114; 502/128; 526/129
[58] Field of Search ..................... 502/104, 113, 502/114, 115, 116, 120, 121, 128

[56] References Cited

U.S. PATENT DOCUMENTS

| | | | |
|---|---|---|---|
| 3,737,476 | 6/1973 | Bailly | 502/128 |
| 3,787,384 | 1/1974 | Stevens | 260/94.9 |
| 4,063,009 | 12/1977 | Ziegler et al. | 526/159 |
| 4,148,754 | 4/1979 | Strobel et al. | 252/429 C |
| 4,173,547 | 11/1979 | Graff | 252/429 B |
| 4,263,168 | 4/1981 | Rochefort et al. | 252/429 B |
| 4,301,029 | 11/1981 | Caunt et al. | 252/429 B |
| 4,362,648 | 12/1982 | Dietz et al. | 252/429 B |
| 4,378,304 | 3/1983 | Dombro | 252/429 B |
| 4,385,161 | 5/1983 | Caunt et al. | 526/114 |
| 4,414,369 | 11/1983 | Kuroda et al. | 526/65 |
| 4,458,058 | 7/1984 | Dombro | 526/129 |
| 4,469,855 | 9/1984 | Cooper | 526/106 |
| 4,481,301 | 11/1984 | Nowlin et al. | 502/104 |
| 4,530,914 | 7/1985 | Ewen et al. | 502/113 |
| 4,558,024 | 12/1985 | Best | 502/115 |

(List continued on next page.)

FOREIGN PATENT DOCUMENTS

| | | |
|---|---|---|
| 2 394 557 | 6/1978 | European Pat. Off. . |
| 0032308 | 7/1981 | European Pat. Off. . |
| 0 173 485 | 3/1986 | European Pat. Off. . |
| 0 369 436 | 5/1990 | European Pat. Off. . |
| 435 557 A2 | 7/1991 | European Pat. Off. . |
| 435 627 A2 | 7/1991 | European Pat. Off. . |
| 0 518 604 A2 | 12/1992 | European Pat. Off. . |
| 59179507 | 10/1984 | Japan . |
| 59179508 | 10/1984 | Japan . |

OTHER PUBLICATIONS

Boor, Jr., John, "Ziegler-Natta Catalysts and Polymerizations", Academic Press, pp. 602–609, (1979).

*Primary Examiner*—Glenn A. Caldarola
*Assistant Examiner*—J. Pasterczyk
*Attorney, Agent, or Firm*—Marina V. Schneller; Dennis P. Santini

[57] ABSTRACT

A catalyst composition for copolymerizing ethylene and alpha-olefins is prepared by treating a silica carrier, in a non-polar hydrocarbon solvent, with a dialkyl magnesium compound, a halogen-containing compound and titanium tetrachloride, to form a catalyst precursor and activating the precursor with dimethylaluminum chloride.

Also disclosed is a process for copolymerizing ethylene and alpha-olefins in the presence of the catalyst of the invention. The polymer products have multimodal molecular weight distributions unlike unimodal molecular weight distributions of polymers prepared with similar catalyst precursors but activated with different alkylaluminum activators, e.g., triethylaluminum or trimethylaluminum.

28 Claims, 4 Drawing Sheets

U.S. PATENT DOCUMENTS

| | | | |
|---|---|---|---|
| 4,558,025 | 12/1985 | Best | 502/115 |
| 4,565,795 | 1/1986 | Short et al. | 502/110 |
| 4,565,797 | 1/1986 | Etherton et al. | 502/116 |
| 4,579,835 | 4/1986 | Best | 502/120 |
| 4,703,094 | 10/1987 | Raufast | 526/65 |
| 4,707,530 | 11/1987 | Johnson | 526/129 |
| 4,719,193 | 1/1988 | Levine et al. | 502/107 |
| 4,727,049 | 2/1988 | Furuhashi et al. | 502/115 |
| 4,732,882 | 3/1988 | Allen et al. | 502/104 |
| 4,832,897 | 5/1989 | Van Der Molen | 526/352.2 |
| 5,047,468 | 9/1991 | Lee et al. | 525/53 |
| 5,139,986 | 8/1992 | Cook et al. | 502/112 |
| 5,258,345 | 11/1993 | Kissin et al. | 502/116 |
| 5,514,634 | 5/1996 | Hagerty et al. | 502/125 |

HIGH ACTIVITY POLYETHYLENE CATALYSTS WHICH PRODUCE BIMODAL OR TRIMODAL PRODUCT MOLECULAR WEIGHT DISTRIBUTIONS

CROSS-REFERENCE TO RELATED APPLICATIONS

This is a continuation of application Ser. No. 08/335,624, filed on Nov. 8, 1994, now abandoned which is a continuation-in-part of Ser. No. 08/121,821 filed Sep. 15, 1993, now abandoned, which, in turn, was a continuation-in-part of application Ser. No. 08/008,854 filed Jan. 25, 1993 now abandoned, (which in turn was a Rule 62 continuation of Ser. No. 07/712,298 filed Jun. 10, 1991, now abandoned) each of which is relied upon and expressly incorporated by reference herein.

FIELD OF THE INVENTION

The invention relates to catalysts for the manufacture of linear polyethylene resins with densities between 0.918 and 0.945 g/cc and with a relatively narrow molecular weight distribution (MWD). Such resins can be processed into film on high-stalk extrusion equipment at high rates with excellent bubble stability and produce film with much improved toughness relative to the film made of polyethylene resins with a relatively broad MWD.

The present invention relates to a method for copolymerizing ethylene and alpha-olefins, a catalyst for such a copolymerization and a method for producing such a catalyst. A particular aspect of the present invention relates to a method for producing linear copolymers of ethylene and alpha-olefins of low density (LLDPE) with a density of less than about 0.93 g/cc, and medium density, (MDPE) with a density of 0.93 to 0.94 g/cc.

The resins produced in accordance with the invention contain a polymer component with a relatively very high molecular weight, and their MWDs are multimodal. Blown film manufactured from these polymers exhibits excellent impact and tear properties. Furthermore, the resins can be processed into film by high-stalk extrusion techniques.

BACKGROUND OF THE INVENTION

One of the measures of MWD of a LLDPE or MDPE resin is the melt flow ratio (MFR), which is the ratio of the high-load melt index (HLMI or $I_{21}$) to the melt index (MI or $I_2$) for a given resin: MFR=$I_{21}/I_2$. The MFR value is an approximate indication of MWD of a polymer: the higher the MFR value, the broader the MWD. All commercial polyethylene resins processed with high-stalk extrusion equipment have a relatively broad MWD as indicated by MFR values of 80–200. Although resins with relatively broad MWD exhibit good processability on high-stalk extrusion equipment, their film toughness properties, such as tear strength, are relatively poor.

In contrast, polyethylene resins with a relatively narrow MWD are not suited for high-stalk film extrusion equipment. We found, however, that even polyethylene resins with a relatively narrow MWD can be processed with such equipment if the resins contain a significant fraction of polymer molecules with very high molecular weights, higher than 700,000. Moreover, such resins exhibit excellent film properties such as impact strength and tear resistance.

It is an object of the present invention to provide a high-activity catalyst for copolymerization of ethylene and alpha-olefins yielding LLDPE and MDPE products with a multimodal, relatively narrow MWD as indicated by MFR values in the 28–70 range. It is an additional object of the present invention to provide a catalytic process for copolymerizing ethylene with alpha-olefins which yields products with a multimodal MWD at high productivity.

SUMMARY OF THE INVENTION

A supported alpha-olefin polymerization catalyst composition of this invention is prepared in a multi-step process. The process for catalyst production comprises (i) providing a slurry, in a non-polar solvent, of a solid porous inorganic support having reactive hydroxyl groups; (ii) impregnating said support having hydroxyl groups with an organomagnesium compound RMgR' to form an intermediate (ii), which intermediate has a [Mg]:[hydroxyl group] molar ratio of greater than 1, wherein said R and R' are alkyl groups of 1 to 12 carbon atoms and are the same or different;

(iii) treating the intermediate of step (ii) with a halogen-containing reagent to form an intermediate of step (iii);

(iv) treating the intermediate of step (iii) with a transition metal (M) compound to form a catalyst precursor which has a [M]/[Mg] molar ratio of greater than 0.5;

(v) combining the catalyst precursor with a dialkylaluminum halide compound, wherein said halogen-containing reagent is effective in increasing the activity of the catalyst composition consisting of said support, said RMgR' compound, said transition metal compound and said alkylaluminum compound.

The invention is also directed to copolymerization processes of ethylene and alpha-olefins conducted in the presence of the catalyst composition of this invention.

DESCRIPTION OF THE DRAWING(S)

DETAILED DESCRIPTION OF THE INVENTION

Figure 1:
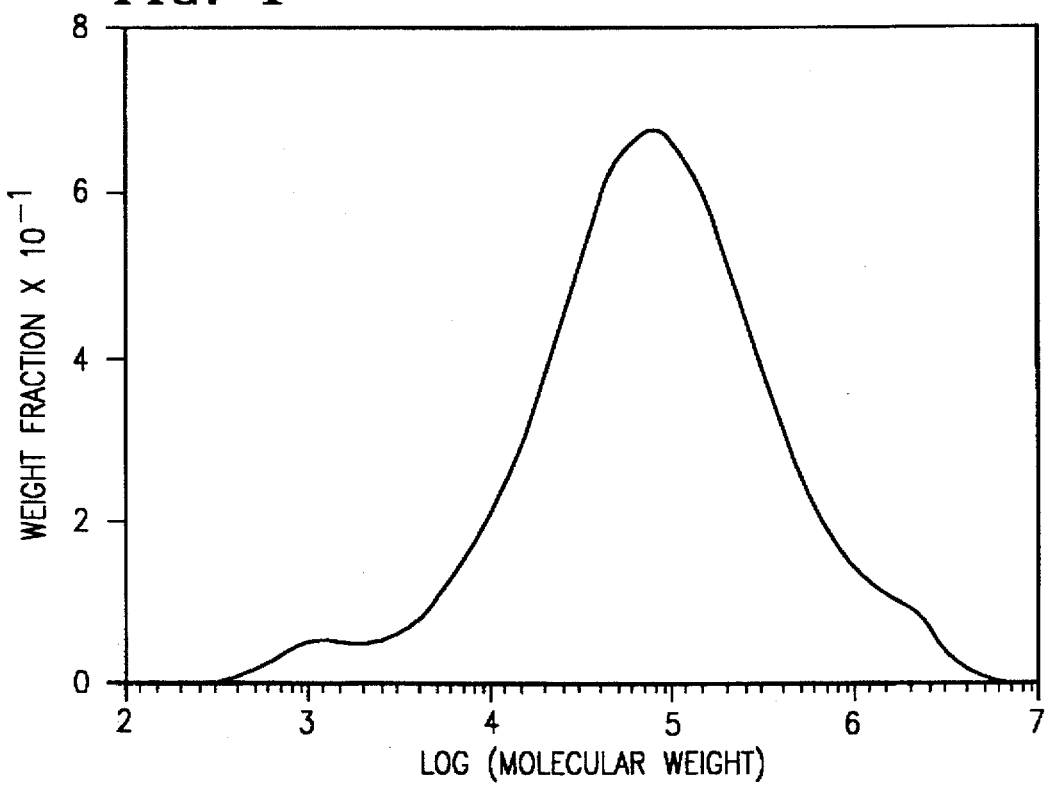
FIG. 1 is a GPC chromatogram of a resin produced with a catalyst composition comprising catalyst precursor of Example 1 and dimethylaluminum chloride (DMAC).

The catalysts described herein exhibit unique catalytic effects in olefin polymerization. In ethylene polymerizations and copolymerizations, the catalysts produce resins with bimodal and trimodal molecular weight distributions in a single reactor. A term "bimodal molecular weight distribution" means herein that the resin produced by the catalysts of the invention contains a first, relatively lower molecular weight component and a second component of a relatively higher molecular weight than said first component.

A term "trimodal molecular weight distribution," as used herein, means that the resin produced by the catalysts of the invention contains three components which differ from each other in molecular weight: first, relatively low molecular weight component, a second component of relatively intermediate molecular weight than said first component and the third component which has the highest molecular weight of said three components. The amount of the high molecular weight component in the bimodal or trimodal products can range from 5 to 50 weight percent. The resins so produced exhibit MFR values of 25 to 80, preferably 30 to 75, and most preferably, 35 to 70.

The resins fabricated into film using high-stalk equipment exhibit superior dart impact properties and machine-direction (MD) tear properties. Dart impact strength is measured by ASTM D-1709, Method A; with a 38.1 mm dart and a drop height of 0.66 meters. MD tear strength is measured by ASTM D-1922 and reported as g/l mil (thickness). For example, the films from resins of the invention exhibit dart drop strength in the range of 100 g to about 1500 g, preferably from 100 g to greater than 800 g and most preferably from 400 to greater than 800 g for a 1.0 mil thick film. A dart impact value of greater than 800 g means that the polymer film punctures less than 50% of the time when a dart of a 800 g mass is dropped onto the film. The tear strength of the film fabricated from the resins of our invention exceeds 40 g. Conventional MDPE film fabricated using high-stalk equipment exhibits dart drop values in the range of 150–400 g and tear strength of about 20 g. Accordingly, resins produced with catalysts of the invention exhibit film toughness properties which combine both high dart impact strength and high MD tear strength: the films from the resins produced with catalysts of the present invention exhibit about 20–100% improvement in dart drop strength over other polyethylene films prepared using high-stalk equipment and yet maintain MD tear values greater than 40 g/mil. In addition to affording LLDPE and MDPE products which exhibit unexpected properties compared to those of resins produced from conventional Ziegler catalysts, the products of polymerization with the catalysts of this invention can be used in high-stalk extrusion processes. This is entirely unexpected for LLDPE and MDPE resins with densities less than 0.94 g/cc, as the LLDPE resins produced with conventional catalysts cannot be processed on high-stalk extrusion equipment.

The unique catalyst compositions of the invention comprise a catalyst precursor composition and a dialkylaluminum halide, such as dimethylaluminum chloride (DMAC) as a cocatalyst (an activator) therefor.

Catalyst precursors produced according to the present invention are described below in terms of the manner in which they are made.

The carrier material for the catalyst precursor is a solid, particulate, porous, preferably inorganic material. These carrier materials include such inorganic materials as oxides of silicon and/or aluminum. The carrier material is used in the form of a dry powder having an average particle size of from about 1 micron to about 250 microns, preferably from about 10 microns to about 150 microns. The carrier material is preferably porous and has a surface area of at least about 3 $m^2/g$ and preferably at least about 50 $m^2/g$. The carrier material should be dry, that is, free of absorbed water. Drying of the carrier material can be effected by heating at about 100° C. to about 1000° C., preferably at about 600° C. When the carrier is silica, it is heated to at least 200° C., preferably about 200° C. to about 850° C. and most preferably at about 600° C. The carrier material must have at least some active hydroxyl groups to produce the catalyst composition of this invention.

In the most preferred embodiment, the carrier is silica which, prior to the use thereof in the first catalyst synthesis step, has been dehydrated by fluidizing it with dry nitrogen or dry air and heating at about 600° C. for about 4–16 hours to achieve a surface hydroxyl group concentration of about 0.7 mmol per gram. The silica of the most preferred embodiment is a high surface area, amorphous silica (surface area 300 $m^2/g$; pore volume of 1.65 $cm^3/g$), and it is a material marketed under the tradenames of Davison 952 or Davison 955 by the Davison Chemical Division of W. R. Grace and Company. The silica is in the form of spherical particles, e.g., as obtained by a spray-drying process.

The carrier material is slurried in a non-polar solvent. Suitable non-polar solvents, which are liquids at reaction temperatures, are materials in which all of the reactants used herein, i.e., organomagnesium compounds, halogen-containing reagents and the transition metal compounds, are at least partially soluble. Preferred non-polar solvents are alkanes, such as isopentane, hexane, heptane, octane, nonane, and decane, although a variety of other materials including cycloalkanes, such as cyclohexane, aromatics, such as benzene, toluene and ethylbenzene, may also be employed. The most preferred non-polar solvent is isopentane. Prior to use, the non-polar solvent should be purified, such as by percolation through molecular sieves, to remove traces of water, oxygen, polar compounds, and other materials capable of adversely affecting catalyst activity. The slurry of the carrier material in the solvent is prepared by introducing the carrier into the solvent, preferably while stirring, and heating the mixture to about 25° to about 100° C., preferably to about 40° to about 60° C.

The slurry is then contacted with the at least one organomagnesium compound, while the heating is continued at the aforementioned temperature. The organomagnesium compound has the empirical formula RMgR' where R and R' are the same or different $C_2$–$C_{12}$ alkyl groups, preferably $C_4$–$C_{10}$ alkyl groups, more preferably $C_4$–$C_8$ alkyl groups, and most preferably both R and R' are butyl groups.

In the most preferred embodiment of the synthesis of this catalyst it is important to add only such an amount of the organomagnesium compound that will be deposited —physically or chemically—onto the carrier since any excess of the organomagnesium compound in the solution may react with other synthesis chemicals and precipitate outside of the carrier. The carrier drying temperature affects the number of sites available for the organomagnesium compound—the higher the drying temperature the lower the number of sites. Thus, the exact molar ratio of the organomagnesium compound to the hydroxyl groups will vary and must be determined on a case-by-case basis to assure that only so much of the organomagnesium compound is added to the solution as will be deposited onto the carrier without leaving any excess of the organomagnesium compound in the solution. Furthermore, it is believed that the molar amount of the organomagnesium compound deposited onto the carrier is greater than the molar content of the hydroxyl groups on the carrier. Thus, the molar ratios given below are intended only as an approximate guideline and the exact amount of the organomagnesium compound in this embodiment must be controlled by the functional limitation discussed above, i.e., it must not be greater than that which can be deposited onto the support. If greater than that amount is added to the solvent, the excess may react with other compounds involved in the synthesis, thereby forming a precipitate outside of the support which is detrimental in the synthesis of the catalyst and is avoided. The amount of the organomagnesium compound which is not greater than that deposited onto the support can be determined in any conventional manner, e.g., by adding the organomagnesium compound to the slurry of the carrier in the solvent, while stirring the slurry, until the excess of the organomagnesium compound is detected in the solvent.

For example, for the silica carrier heated at about 600° C., the amount of the organomagnesium compound added to the slurry is such that the molar ratio of Mg to the hydroxyl groups on the carrier surface is about 1:1 to about 3:1, preferably about 1.1:1 to about 2:1, more preferably about 1.2:1 to about 1.8:1, and most preferably about 1.4:1. The Mg loading on a silica support may be 0.7 to 1.3 mmol Mg/g silica. The solution of the organomagnesium compound mixes with the non-polar solvent to form a solution from which the organomagnesium compound is deposited onto the carrier.

It is also possible to add such an amount of the organomagnesium compound which is in excess of that which will be deposited onto the support, and then remove, e.g., by filtration and washing, any excess of the organomagnesium compound. However, this alternative is less desirable than the most preferred embodiment described above.

In the third step, the slurry containing the organomagnesium-contacted support is treated with the halogen-containing reagent. The halogen-containing reagent is selected from the group consisting of carbon tetrachloride and 1,1,1-trichloroethane; and is most preferably carbon tetrachloride. The molar ratio of the halogen-containing reagent to the organomagnesium compound can range from 0.3 to 3; more preferably, the halogen reagent/Mg ratio is 0.46 to 2.57 and most preferably 1.32. The carbon tetrachloride loading may range from 0.6 to 1.8 mmol/g silica. The temperature of the treatment with the halogen-containing reagent is about 20°–60° C. The effect of this treatment step is to increase the activity and the meet flow index response of the catalyst.

Finally, the slurry is contacted with at least one transition metal compound soluble in the non-polar solvent.

This synthesis step is conducted at about 25° to about 65° C., preferably at about 30° to about 60° C., and most preferably at about 40° to about 55° C. In a preferred embodiment, the amount of the transition metal compound, such as titanium compound, is not greater than that which can be deposited onto the carrier. By way of illustration, it is noted that the titanium loading on silica can range from 0.7 to 1.3 mmol Ti/g of silica, and preferably is 1.0 mmol Ti/g silica. The exact molar ratio of Mg to the transition metal and of the transition metal to the hydroxyl groups of the carrier will therefore vary (depending, e.g., on the carrier drying temperature) and must be determined on a case-by-case basis. For example, for the silica carrier heated at about 200° to about 850° C., the amount of the transition metal compound is such that the molar ratio of the transition metal, derived from the transition metal compound, to the hydroxyl groups of the carrier is about 1.0 to about 2.0, preferably about 1.2 to about 1.8. The amount of the transition metal compound is also such that the molar ratio of Mg to the transition metal is about 0.5 to about 2.0, preferably about 0.7 to about 1.3 and most preferably 1.0.

Suitable transition metal compounds used herein are compounds of metals of Groups 4, 5, or 6 of the Periodic Chart of the Elements, as published by Chemical and Engineering News, 63(5), 27, 1985, providing that such compounds are soluble in the non-polar solvents. Non-limiting examples of such compounds are titanium and vanadium halides, e.g., titanium tetrachloride ($TiCl_4$), vanadium tetrachloride ($VCl_4$), vanadium oxytrichloride ($VOCl_3$), titanium and vanadium alkoxides, wherein the alkoxide moiety has a branched or unbranched alkyl radical of 1 to about 20 carbon atoms, preferably 1 to about 6 carbon atoms. The preferred transition metal compounds are titanium compounds, preferably tetravalent titanium compounds. The most preferred titanium compound is titanium tetrachloride.

Mixtures of such transition metal compounds may also be used and generally no restrictions are imposed on the transition metal compounds which may be included. Any transition metal compound that may be used alone may also be used in conjunction with other transition metal compounds.

The catalyst synthesis procedure must be conducted in such a manner as to avoid the reaction of two or more reagents in the non-polar solvent to form a reaction product insoluble in the non-polar solvent outside of the pores of the solid catalyst support. Such an insoluble reaction product would be incapable of reacting with the carrier or the catalyst intermediate and therefore would not be incorporated onto the solid support of the catalyst composition.

The catalyst precursors of the present invention are prepared in the substantial absence of water, oxygen, and other catalyst poisons. Such catalyst poisons can be excluded during the catalyst preparation steps by any well known methods, e.g., by carrying out the preparation under an atmosphere of nitrogen, argon or other inert gas. Purification of the non-polar solvent employed in the catalyst is also helpful in this regard.

After synthesis of the precursor is completed, the non-polar solvent is slowly removed, e.g., by distillation or evaporation. The temperature at which the non-polar solvent is removed from the synthesis mixture can affect the productivity of the resulting catalyst composition. Lower solvent removal temperatures produce catalyst compositions which are more active than those produced with higher solvent removal temperatures. For this reason, it is preferred to remove the non-polar solvent at about 40° to about 65° C., preferably at about 45° to about 55° C. and most preferably at about 55° C. by drying, distillation or evaporation or any other conventional means. Excess amounts of halogen-containing reagent can be removed simultaneously with the non-polar solvent(s). The excess halogen-containing reagent may also be removed by filtration and washing the silica-containing intermediate prior to addition of the transition metal compound. The most preferred precursor composition per gram silica comprises 1.00 mmol dibutylmagnesium (DBM); 1.32 mmol carbon tetrachloride and 1.00 mmol $TiCl_4$.

The resulting free-flowing powder, referred to herein as a catalyst precursor, is combined with the cocatalyst. It was found that the combination of the precursor of this invention with the activator of this invention produces a polymerization catalyst composition having high activity. The productivity of the catalysts prepared according to the present invention is at least about 1,000 and can be as much as 5,000 grams of polymer per gram of catalyst precursor per 100 psi of ethylene partial pressure.

The activator used herein is a dialkylaluminum halide, e.g., dimethylaluminum chloride (DMAC). The activator is used in an amount which is at least effective to promote the polymerization activity of the solid catalyst precursor of this invention. The amount of the activator is sufficient to give an Al:Ti molar ratio of about 15:1 to about 1000:1, preferably about 20:1 to about 300:1, and most preferably about 25:1 to about 100:1.

The catalyst may be activated in a polymerization reactor by adding the activator and the catalyst precursor separately to the polymerization medium. It is also possible to combine the catalyst precursor and the activator before the introduction thereof into the polymerization medium, e.g., for up to about 2 hours prior to the introduction thereof into the polymerization medium, at a temperature of from about −40° to about 100° C.

Ethylene and its mixtures with alpha-olefins are polymerized with the catalysts prepared according to the present invention by any suitable process. Such processes include polymerizations carried out in suspension, in solution or in the gas phase. Gas phase polymerization reactions are preferred, e.g., those taking place in stirred bed reactors and, especially, fluidized-bed reactors.

A particularly desirable method for producing polyethylene copolymers according to the present invention is in a fluidized-bed reactor. Such a reactor and method for operating the same are described by Nowlin et al, U.S. Pat. No. 4,481,301, the entire contents of which is incorporated herein by reference.

The molecular weight of the polymers may be controlled in a known manner, e.g., by using hydrogen. With the catalysts produced according to the present invention, molecular weight may be suitably controlled with hydrogen when the polymerization is carried out at relatively low temperatures, e.g., from about 70° to about 105° C. The molecular weight control is evidenced by an increase in the melt index of the polymer when the molar ratio of hydrogen to ethylene in the reactor is increased.

The ethylene copolymers prepared in accordance with the present invention may be copolymers of ethylene with one or more $C_3$–$C_{10}$ alpha-olefins. Thus, copolymers having two monomeric units are possible as well as terpolymers having three monomeric units. Particular examples of such polymers include ethylene/propylene copolymers, ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers and ethylene/propylene/1-butene terpolymers. The most preferred polymers are copolymers of ethylene with 1-hexene, 1-butene or 4-methyl-1-pentene.

The ethylene copolymers produced in accordance with the present invention preferably contain at least about 80 weight percent of ethylene units, and most preferably contain from 90 to 95 weight percent of ethylene units.

The molecular weight distribution of the polymers prepared in the presence of the catalysts of the present invention, as expressed by the MFR values, varies from about 26 to about 70 for LLDPE and MDPE products having a density of about 0.920 to about 0.945 g/cc, and 12 values of about 0.1 to about 0.7. As is known to those skilled in the art, such MFR values are indicative of a relatively narrow molecular weight distribution, thereby rendering the polymers especially suitable for low density film applications since the products exhibit less molecular orientation in high-speed film blowing processes and therefore have greater film strength.

The following Examples further illustrate the essential features of the invention. However, it will be apparent to those skilled in the art that the specific reactants and reaction conditions used in the Examples do not limit the scope of the invention.

The properties of the polymers produced in the Examples were determined by the following test methods:

| | |
|---|---|
| Density | ASTM D-1505 - A plaque is made and conditioned for one hour at 100° C. to approach equilibrium crystallinity. Measurement for density is then made in a density gradient column; reported as g/cc. |
| Melt Index (MI), $I_2$ | ASTM D-1238 - Condition E - Measured at 190° C. - reported as grams per 10 minutes. |
| High Load Melt (HLMI), Index $I_{21}$ | ASTM D-1238 - Condition F - Measured at 10 times the weight used in the melt index test above. |
| Melt Flow Ratio (MFR) = $I_{21}/I_2$ | |
| Comonomer Content | Comonomer contents of ethylene copolymers were measured by the infrared spectroscopic method, as described in the article of T. E. Nowlin, Y. V. Kissin and K. P. Wagner HIGH ACTIVITY ZIEGLER-NATTA CATALYST FOR THE PREPARATION OF ETHYLENE COPOLYMERS, Journal of Polymer Science: Part A: Polymer Chemistry, Volume 26, pages 755–764 (1988). |
| Dart Impact | ASTM D1709 Free Falling DART Method (F50) |
| Tear Strength | ASTM D-1922 |

EXAMPLE 1

Catalyst Precursor (A): 3.04 g of silica calcined at 600° C. for 4 hours was placed into a 100 ml pear-flask containing a magnetic stirring bar followed by 40 ml of dry heptane. The flask was placed into a 62° C. oil bath. Next, dibutylmagnesium (3.09 mmol) was added to the silica/heptane slurry. The contents of the flask were stirred for 45 minutes. Then, 1-butanol (6.04 mmol) was added to the flask and the contents were stirred for 55 minutes. Finally, titanium tetrachloride (3.03 mmol) was added to the flask and stirring was continued for 45 minutes. The solvent was removed from the flask with a nitrogen purge and 3.8 g of a white free-flowing powder of the catalyst precursor was obtained.

EXAMPLE 2

Catalyst Precursor (B): 3.04 g of silica calcined at 600° C. for 4 hours was placed into a 100 ml pear-flask containing a magnetic stirring bar followed by 40 ml of dry heptane. The flask was placed into a 63° C. oil bath. Next, dibutylmagnesium (1.92 mmol) was added to the silica/heptane slurry. The contents of the flask were stirred for 90 minutes. Next, titanium tetrachloride (3.03 mmol) was added to the flask and stirring was continued for 45 minutes. The solvent was removed from the flask with a nitrogen purge and 3.5 g of a dark brown, free-flowing powder of catalyst precursor B was obtained.

EXAMPLE 3

Catalyst Precursor (C): 5.06 g of silica calcined at 600° C. for 4 hours was placed into a 300 ml pear-flask, containing a magnetic stirring bar, followed by 75 ml of dry heptane. The flask was placed into a 55° C. oil bath. Next, dibutylmagnesium (5.06 mmol) was added to the silica/heptane slurry. The contents of the flask were stirred for 80 minutes.

Then, carbon tetrachloride (6.68 mmol) was added to the flask and the contents were stirred for 45 minutes. Finally, titanium tetrachloride (5.07 mmol) was added to the flask and stirring was continued for 45 minutes. The solvent was removed from the flask with a nitrogen purge and 5.59 g of a light brown free-flowing powder of catalyst precursor C was obtained.

EXAMPLE 4

Catalyst Precursor (D): 207.1 g of silica calcined at 600° C. for 4 hours was placed into a four-neck, 3-liter round-bottom flask fitted with an overhead stirrer. The flask was placed into an oil bath at ca. 60° C. and 1300 ml of dry heptane was added to the flask. Next, dibutylmagnesium (207.6 mmol) was added to the silica/heptane slurry over a period of 5 minutes. Then, 1,1,1-trichloroethane (251 mmol) was added to the flask in about 40 seconds and the contents were stirred for 60 minutes. Next, titanium tetrachloride (187 mmol) was added to the flask and stirring was continued for 60 minutes. The solvent was removed from the flask with a nitrogen purge and 230 g of a light brown free-flowing powder of catalyst precursor D was obtained.

EXAMPLE 5

Catalyst Precursor (E): 6.00 g of silica calcined at 600° C. for 6 hours was placed into a 300 ml pear-flask, containing a magnetic stirring bar, followed by 100 ml of dry heptane. The flask was placed into a 55° C. oil bath. Next, dibutylmagnesium (6.00 mmol) was added to the silica/heptane slurry. The contents of the flask were stirred for 62 minutes. Then, tetraethyl orthosilicate (3.96 mmol) was added to the flask and the contents were stirred for 128 minutes. Finally, titanium tetrachloride (6.00 mmol) was added to the flask and stirring was continued for 57 minutes. The solvent was removed from the flask with a nitrogen purge and 3.4 g of a free-flowing powder of catalyst precursor E was obtained.

mixture was then dried under a nitrogen purge at 60° C. over a period of 4 hours to provide a dry, free-flowing powder containing 5.5 wt. % of the aluminum alkyl.

Finally, the pretreated silica was added to the solution of the catalyst components prepared as above. The resulting slurry was stirred for ¼ hour and then the solvent was dried under a nitrogen purge at 60° C. over a period of 4 hours to provide free-flowing powder of the catalyst precursor F.

Six different catalyst precursors of Examples 1–6 were evaluated with DMAC as cocatalyst in order to determine the effect of the catalyst type on the fraction of high molecular weight (HMW) component in the polymer. The laboratory slurry polymerization data is summarized in Table I. Typical slurry polymerization conditions in these experiments, as described for Catalyst precursor D were as follows: A 1.6-liter stainless steel autoclave, at 53° C., was filled with 0.750 liter of dry heptane, 0.120 liter of dry 1-hexene, and 3.0 mmol of DMAC was added while under a slow nitrogen purge. The stirring rate was set at about 900 rpm, the internal temperature was increased to ca. 85° C., and the internal pressure was raised from 8 psi to 59 psi with hydrogen. Ethylene was introduced to maintain the total pressure at 200 psi. Next, 0.0192 g of Catalyst precursor D was introduced into the reactor with ethylene over-pressure and the temperature was maintained at 85° C. for 60 minutes, then the ethylene supply was stopped and the reactor was allowed to cool to room temperature. A yield of 59.4 g of polyethylene was collected. The high-load flow index (HLMI) of this polymer was 8.67, the Melt Flow Ratio was 38.0, and the polymer contained 1.4 mol % of 1-hexene. The GPC chromatograms of the polymers prepared with each type of catalyst are illustrated in FIGS. 1–6.

TABLE I

Figure 2:
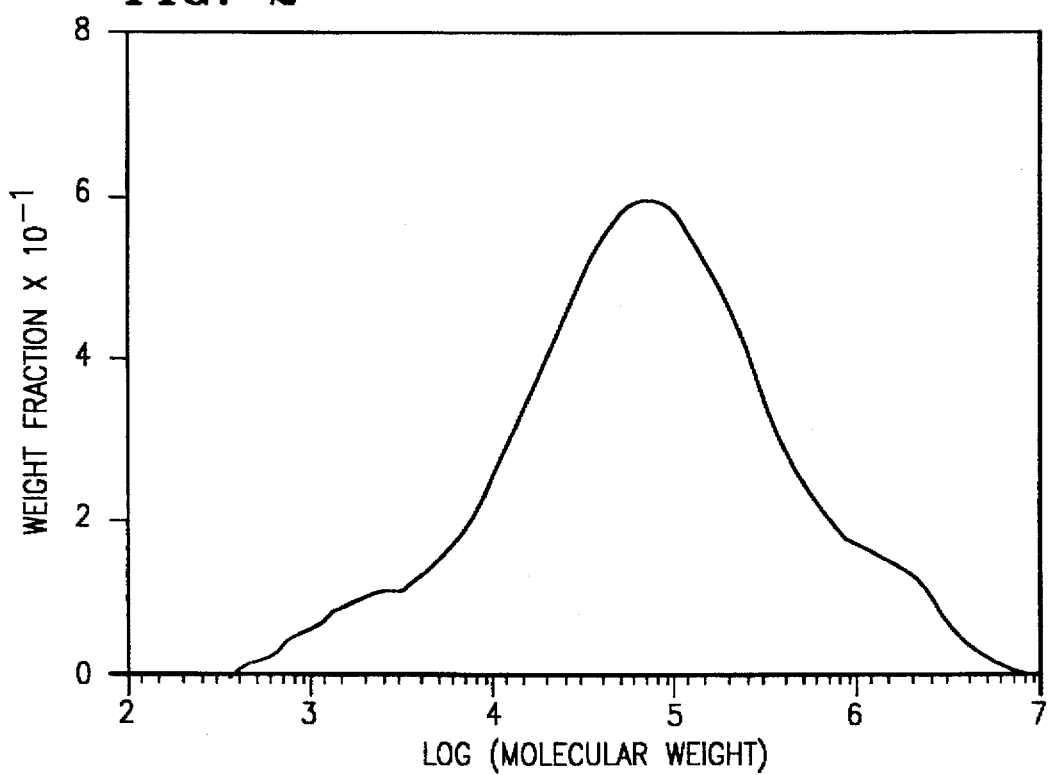
FIG. 2 is a GPC chromatogram of a resin produced with a catalyst composition comprising catalyst precursor of Example 2 and DMAC.
Figure 3:
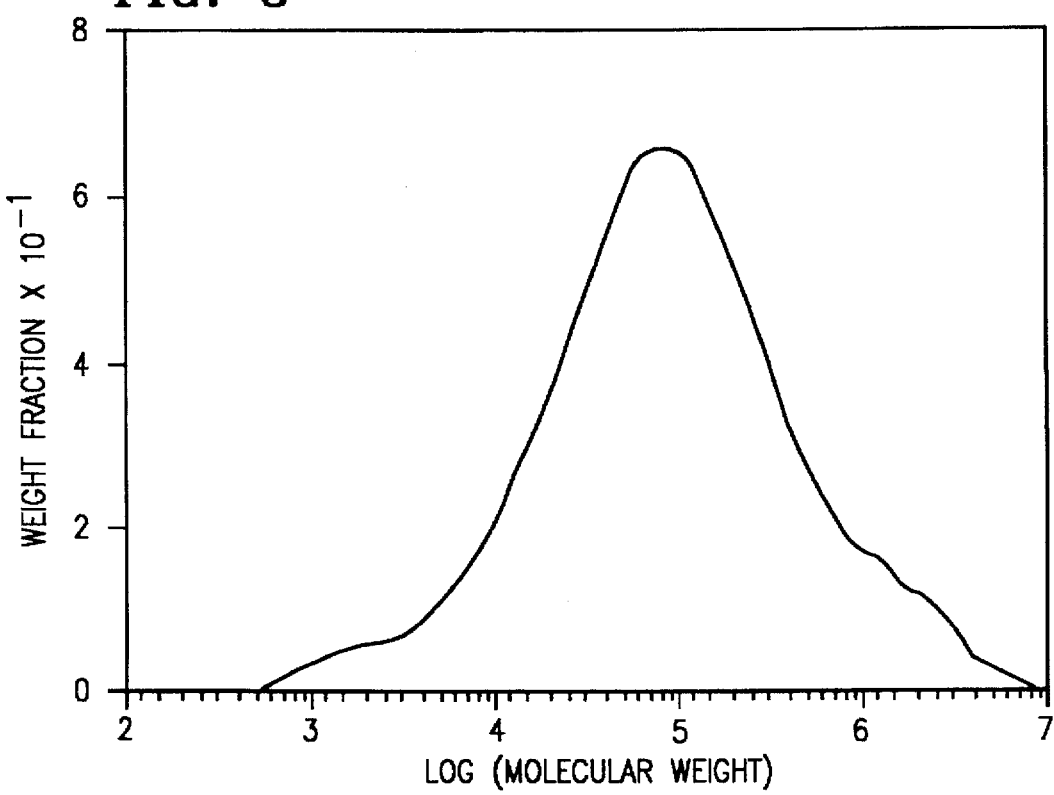
FIG. 3 is a GPC chromatogram of a resin produced with a catalyst composition comprising catalyst precursor of Example 3 and DMAC.
Figure 4:
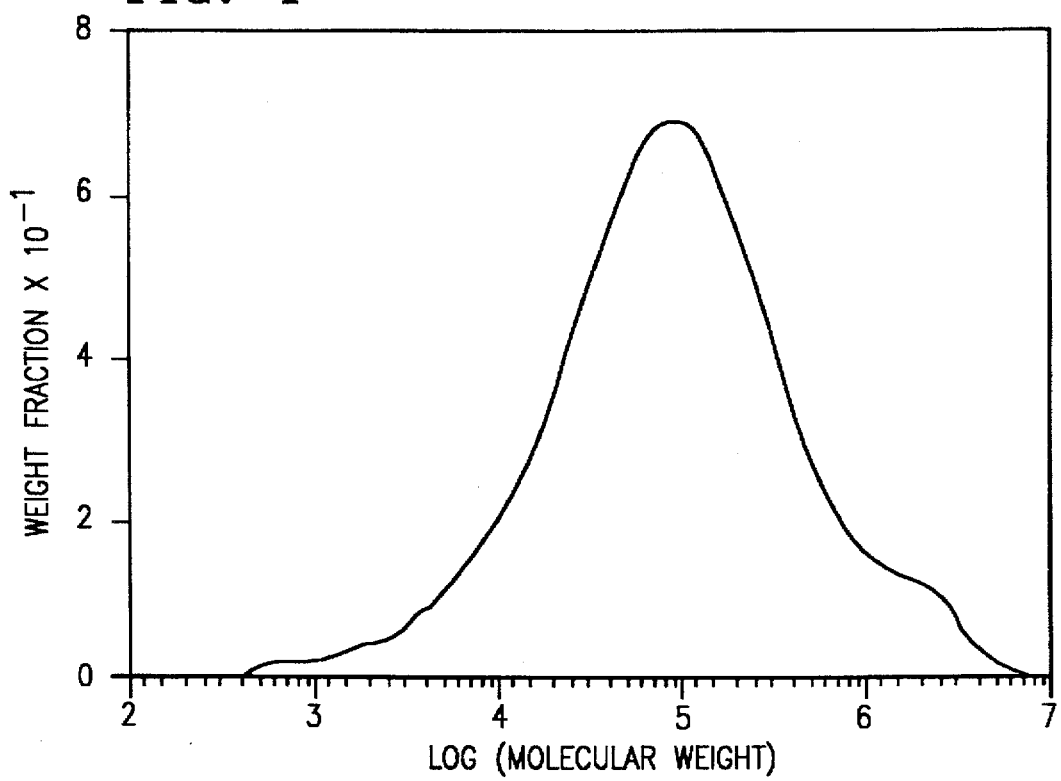
FIG. 4 is a GPC chromatogram of a resin produced with a catalyst composition comprising catalyst precursor of Example 4 and DMAC.
Figure 5:
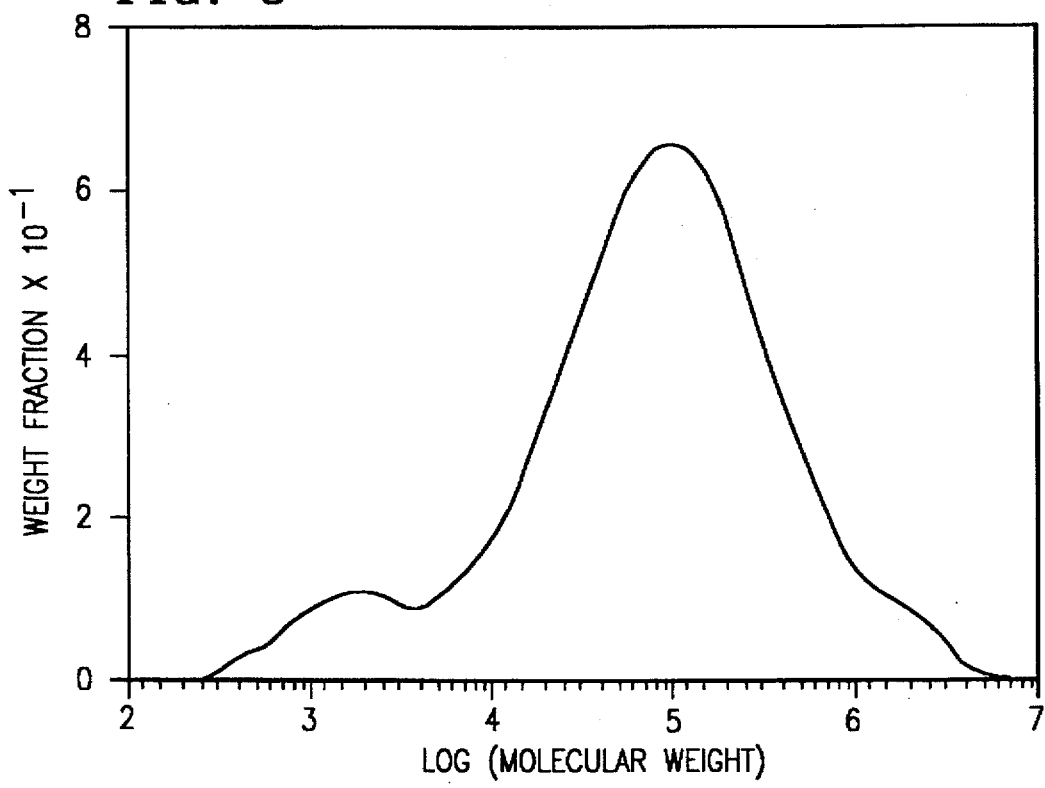
FIG. 5 is a GPC chromatogram of a resin produced with a catalyst composition comprising catalyst precursor of Example 5 and DMAC.
Figure 6:
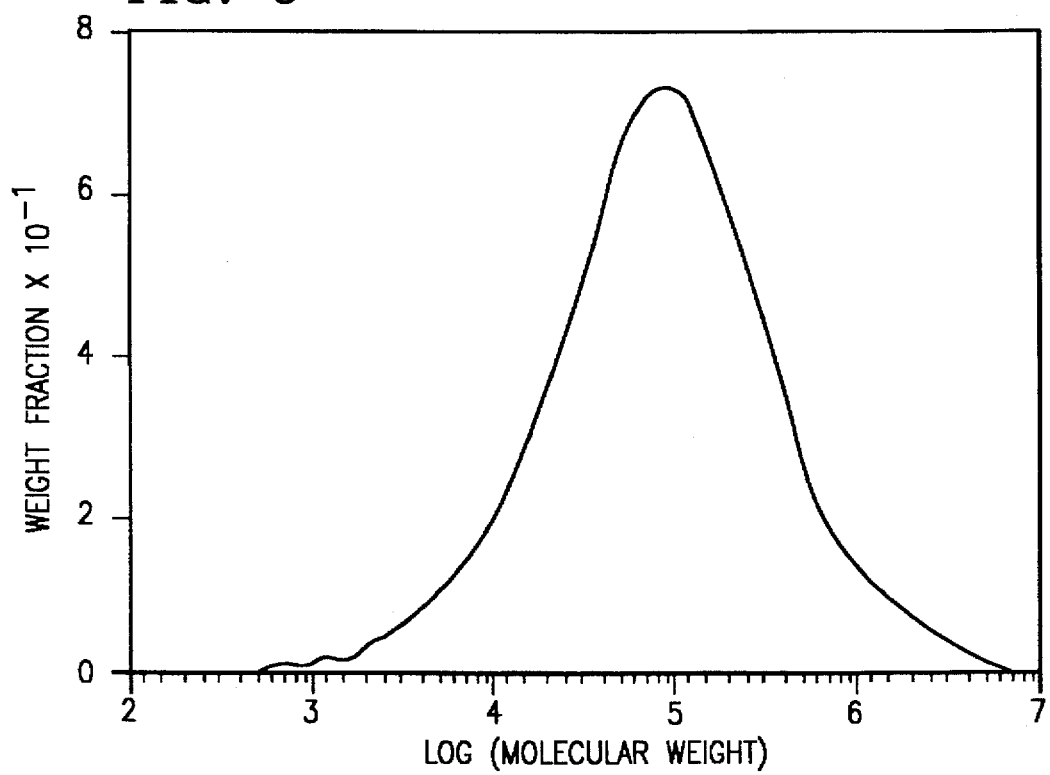
FIG. 6 is a GPC chromatogram of a resin produced with the catalyst composition comprising catalyst precursor of Example 6 and DMAC.

| | Slurry Polymerization Data | | | | | |
|---|---|---|---|---|---|---|
| Catalyst* | Activity g/g/h | FI ($I_{21}$) | MFR ($I_{21}/I_2$) | 1-Hexene, mol % | HMW Component (wt %) | GPC Figure Number |
| A | 2130 | 7.0 | 33.1 | 1.25 | 10.8 | FIG. 1 |
| B | 1250 | 10.6 | 52.2 | 1.35 | 13.4 | FIG. 2 |
| C | 2609 | 8.6 | 38.8 | 1.45 | 12.8 | FIG. 3 |
| D | 3080 | 8.7 | 38.0 | 1.40 | 10.8 | FIG. 4 |
| E | 1570 | 8.1 | 33.5 | 1.70 | 9.2 | FIG. 5 |
| F | 2390 | 12.8 | 28.9 | 1.15 | 7.2 | FIG. 6 |

*DMAC as activator

EXAMPLE 6

Catalyst Precursor (F) A catalyst precursor was synthesized according to the teachings of Yamaguchi et al, U.S. Pat. No. 3,989,881, and Karol et al, European Patent Application 84103441.6.

In a 12-liter flask equipped with a mechanical stirrer were placed 41.8 g (0.439 mol) of anhydrous $MgCl_2$ and 2.5 liters of tetrahydrofuran. To this mixture, 29.0 g (0.146 mol) of $TiCl_3.0.33 AlCl_3$ powder were added over a ½ hour period. The mixture was then heated at 60° C. for another ½ hour in order to completely dissolve all materials.

Figure 7:
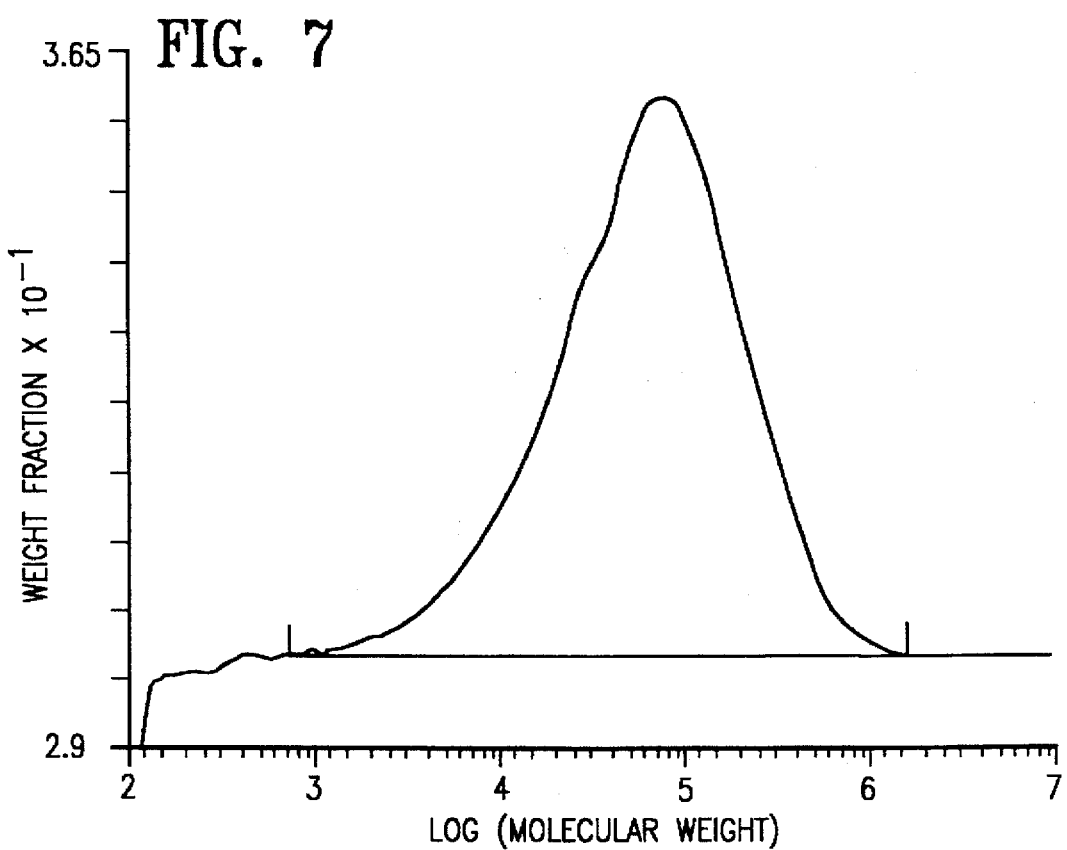
FIG. 7 is a GPC chromatogram of a LLDPE resin produced with a catalyst composition of Example 6 in which trimethylaluminum (TMA) was used as a substitute for DMAC.
Figure 8:
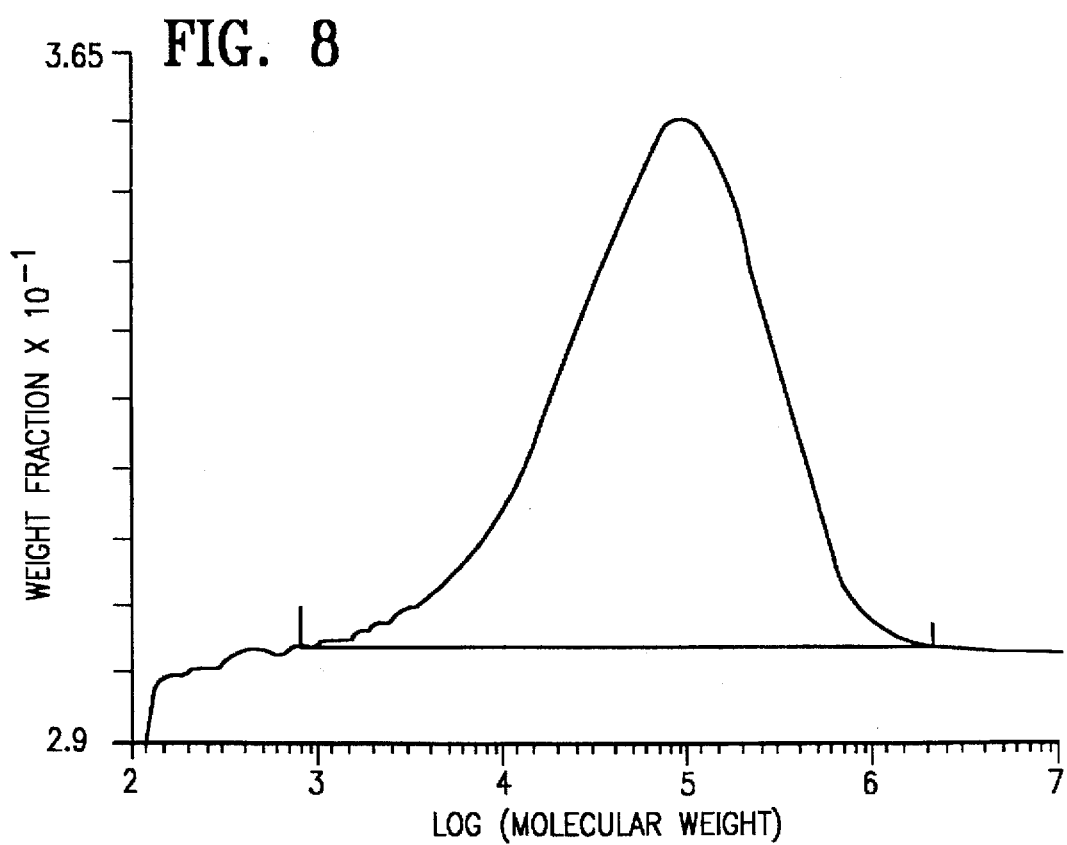
FIG. 8 is a GPC chromatogram of a LLDPE resin produced with a catalyst composition of Example 6 in which triethylaluminum (TEAL) was used as a substitute for DMAC.

Separately, 500 g of silica were dehydrated by heating at a temperature of 600° C. and slurried in 3 liters of isopentane. The slurry was pretreated with 186 ml of a 20 percent by weight solution of TEAL in hexane which was added to the stirred silica slurry over a ¼ hour period. The resulting Each of five catalysts A-E yielded a larger HMW-component than Catalyst F in both slurry and gas-phase reactors. Catalyst F provided 7.2 wt % of the HMW component under slurry polymerization conditions while other five catalysts gave 9.2–13.4 wt % of the HMW component under slurry conditions. In contrast, when catalysts A–F were activated with trialkylaluminum compounds as cocatalysts none of the polymer samples contained the HMW component. As an example, FIGS. 7 and 8 show GPC chromatograms of resins prepared with catalyst precursor F activated with triethylaluminum and trimethylaluminum, respectively.

Table II summarizes some gas-phase, fluidized-bed product data for Catalyst F, E and C.

TABLE II

Gas-Phase Polymerization Data

| Catalyst* | HMW Component (wt %) | Bubble Stability During Film Fabrication |
|---|---|---|
| C | 16.6 | Excellent |
| E | 12.7 | Good |
| F | 8.3 | Poor |

*DMAC as activator

Catalyst C gave a polymer with the highest fraction (16.6 wt %) of the HMW component while Catalyst E and Catalyst F produced 12.7 wt % and 8.3 wt % of the HMW component, respectively.

Four catalysts, A, B, C, E, produced resins with trimodal MWDs with a substantial amount of a LMW component in slurry polymerizations, whereas Catalyst D and Catalyst F did not produce much of a LMW component. On the other hand, when Catalysts C, E and F have been evaluated in the gas-phase fluidized-bed reactor, the GPC chromatograms of the resins produced with these catalysts did not contain a distinct LMW component. It is inferred that there is a process effect on the polymer composition under the polymerization conditions used. Under slurry conditions, resins produced with some of these catalysts possess a trimodal MWD; however, the same catalysts produced resins in the gas-phase fluidized-bed reactor in which the LMW component was substantially absent.

The relative bubble stability during film fabrication using resins produced with DMAC as cocatalyst in combination with catalyst precursors of Examples 3, 5 and 6 are described in Table III.

one hour. A halogen containing reagent (9.2 mmol) was added to the slurry (50°–55° C.) and stirring was continued for one hour. TiCl$_4$ (7.0 mmol) was added to the reaction medium (50°–55° C.) and stirring was continued for an additional hour. Hexane was then removed by distillation with a nitrogen purge at 50°–55° C. Yield varied from 8.0–9.3 grams depending on the halogen containing reagent employed.

Polymerization

Ethylene/1-hexene copolymers were prepared with these catalysts under the same polymerization conditions. A typical example is shown below.

A 1.6 liter stainless steel autoclave under a slow nitrogen purge at 50° C. was filled with 750 ml of dry hexane, 30 ml of dry 1-hexene, and 3.0 mmol of triethylaluminum. The reactor was closed, the stirring was increased to 900 rpm, and the internal temperature was increased to 85° C. The internal pressure was raised 12 psi with hydrogen. Ethylene was introduced to maintain the pressure at about 120 psia. The internal temperature was decreased to 80° C., 20.0 mg of catalyst precursor was introduced into the reactor with ethylene over-pressure, and the internal temperature was increased and held at 85° C. The polymerization was continued for 60 minutes, and then the ethylene supply was stopped and the reactor was allowed to cool to room temperature. The polyethylene was collected and air dried.

Given below are the catalyst productivities and polymer flow indexes and melt flow ratios ($I_{21}/I_2$). The catalysts were prepared according to the sequence.

TABLE III

| | Commercial | Relatively Narrow MWD MFR 29-65 | | | | Commercial |
|---|---|---|---|---|---|---|
| | LDLPE Resin Phillips Marlex D252 | Example 5 Precursor | Catalyst of U. S. Pat. No. 5,258,345 | Example 3 Precursor | Example 6 Precursor* | HDPE Resin OxyChem L5005 |
| MI | 0.26 | 0.2 | 0.2 | 0.1 | 0.3 | 0.05 |
| MFR | 84 | 37 | 36 | 65 | 29 | 190 |
| Density, g/cc | 0.922 | 0.926 | 0.923 | 0.923 | 0.922 | 0.949 |
| DDI, F50 | 670 | >800 | >800 | >800 | >800 | 400 |
| MDT, g/mil | 120 | 160 | 165 | 110 | 310 | 24 |
| Bubble Stability | Moderate | Moderate | Moderate | Excellent | Poor | Good |

1.0 mil film properties (Alpine)
4:1 BUR, 120 lb/h, 27" Stalk height

*- Could not draw down to 1.0 mil due to poor bubble stability
BUR; blow-up ratio This is to cross-reference this application to its parent application; this application is a continuation in part of copending Ser. No. 08/008,854 filed Jan. 25, 1993, now abandoned, which in turn is a Rule 62 continuation of Ser. No. 07/712,298 filed Jun. 10, 1991 (now abandoned). The following comparative examples 1–9 are from commonly assigned application Ser. No. 08/121,821.

Catalyst Precursor Preparation

All manipulations were conducted under a nitrogen atmosphere by using standard Schlenk techniques. Into a 200 ml Schlenk flask was placed 7.0 grams of Davison grade 955 silica, which was previously dried under a nitrogen purge at 600° C. for about 16 hours. Hexane (90 ml) was added to the silica. Dibutylmagnesium (7.0 mmol) was added to the stirred slurry at 50°–55° C. and stirring was continued for

| Comparable Ex. No. | DBM Silica → Halogen Reagent | Halogen Reagent → (1) Productivity | Co-Catalyst | TiCl$_4$ → Flow Index | H$_2$(2) (Psi) | MFR |
|---|---|---|---|---|---|---|
| 1 | None (Control) | 590 | TEAL | 2.4 | 12 | 70.1 |
| 2 | tin (IV) chloride | 3830 | TEAL | 3.8 | 12 | 30.9 |
| 3 | iodine | 3240 | TEAL | 9.3 | 12 | 38.0 |
| 4 | iodine monochloride | 3680 | TEAL | 6.0 | 12 | 38.3 |
| 5 | carbon tetrachloride | 4660 | TEAL | 7.4 | 12 | 35.8 |
| 6 | carbon tetrachloride | 3405 | TEAL | 11.7 | 14 | 34.3 |
| 7 | carbon tetrachloride | 4160 | DIBAH | 8.7 | 14 | 48.7 |
| 8 | carbon tetrachloride | 3065 | TEAL | 416 | 76 | 30.5 |
| 9 | carbon tetrachloride | 3100 | DIBAH | 720 | 76 | 36.9 |

(1)g polyethylene/g catalyst/hr/100 psi ethylene
(2)hydrogen pressure in polymerization reactor Thus it is apparent that there has been provided, in accordance with the invention, a composition, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A catalyst composition for producing, in a single reactor, a product with bimodal or trimodal molecular weight distribution, selected from the group consisting of polymers and copolymers of ethylene, wherein the product is characterized by a density in a range of from 0.918 to 0.949 g/cc and by MFR value in a range of from 28 to 70, said MFR value being a ratio of I$_{21}$/I$_2$, wherein I$_2$ and I$_{21}$ are melt indices which are measured according to ASTM D-1238, Conditions E and F;

wherein said product contains from 5 to 50 weight percent of a component with a molecular weight higher than 700,000;

wherein the catalyst composition is formed by steps comprising:

(i) providing a slurry, in a non-polar solvent, of porous silica having hydroxyl groups on its surface;

(ii) impregnating said silica with an organomagnesium compound RMgR' to form an intermediate (ii), wherein R and R' are alkyl groups of 4 to 10 carbon atoms and are the same or different; wherein said RMgR' is soluble in said non-polar solvent; and wherein the molar ratio of the hydroxyl groups to magnesium is less than 1;

(iii) treating intermediate (ii) with carbon tetrachloride to form an intermediate (iii); wherein the amount of carbon tetrachloride is effective to provide a CCl$_4$ to organomagnesium compound molar ratio of 0.3 to 3.0;

(iv) treating intermediate (iii) with titanium tetrachloride and removing said non-polar solvent from the slurry to form a solid catalyst precursor; wherein the amount of titanium tetrachloride is effective to provide a Ti:hydroxyl group molar ratio of greater than 1.0; and (v) combining said solid catalyst precursor with dimethylaluminum chloride as cocatalyst; wherein the amount of cocatalyst is effective to provide an Al:Ti molar ratio of greater than 10.

2. The catalyst of claim 1, wherein steps (ii), (iii) and (iv) are conducted at a temperature in the range of 40 to degrees C.

3. The catalyst composition of claim 2, wherein R and R' are C$_4$–C$_8$ alkyl groups.

4. The catalyst composition of claim 3, wherein each of R and R' comprises a butyl group.

5. The catalyst composition of claim 4, wherein the non-polar solvent is a hydrocarbon which is liquid under ambient conditions.

6. The catalyst composition of claim 2, wherein the amount of TiCl$_4$ used in said step (iv) is such that the molar ratio of Mg to Ti is about 0.5 to about 2.

7. The catalyst composition of claim 6, wherein the amount of TiCl$_4$ used in said step (iv) is such that the molar ratio of Mg to Ti is about 0.75 to about 1.5.

8. The catalyst composition of claim 6, wherein the amount of the organomagnesium compound used in said step (ii) is such that the molar ratio of (Mg):(OH) is about 1:1 to about 3:1.

9. The catalyst composition of claim 7, wherein the amount of the organomagnesium compound used in said step (ii) is such that the molar ratio of (Mg):(OH) is about 1.1:1 to about 2:1.

10. The catalyst composition of claim 8, wherein the amount of the organomagnesium compound used in said step (ii) is such that the molar ratio of (Mg):(OH) is about 1.2:1 to about 1.8:1.

11. The catalyst composition of claim 10, wherein the amount of the organomagnesium compound used in said step (ii) is such that the molar ratio of (Mg):(OH) is about 1.4:1.

12. The catalyst composition of claim 11, wherein the silica, prior to contact thereof with the solvent in step (i), is heated at a temperature of at least about 200° C.

13. The catalyst composition of claim 12, wherein the silica is heated at a temperature of about 600° C.

14. The catalyst composition of claim 13, wherein the silica has, after heating, a surface hydroxyl group concentration of about 0.7 mmol/g, a surface area of 300 m$^2$/g and a pore volume of 1.65 cm$^3$/g.

15. A catalyst composition for producing, in a single reactor, a product with bimodal or trimodal molecular weight distribution, selected from the group consisting of polymers and copolymers of ethylene, wherein the product is characterized by a density in a range of from 0.918 to 0.949 g/cc and by MFR value in a range of from 28 to 70, said MFR value being a ratio of I$_{21}$/I$_2$, wherein I$_2$ and I$_{21}$ are melt indices which are measured according to ASTM D-1238, Conditions E and F;

wherein said product contains from 5 to 50 weight percent of a component with a molecular weight higher than 700,000;

wherein the catalyst composition is formed by steps comprising:
(i) providing a slurry, in a non-polar solvent, of porous silica having hydroxyl groups on its surface;
(ii) impregnating said silica with an organomagnesium compound RMgR' to form an intermediate (ii), wherein R and R' are alkyl groups of 4 to 10 carbon atoms and are the same or different; wherein said RMgR' is soluble in said non-polar solvent; and wherein the molar ratio of the hydroxyl groups to magnesium is less than 1;
(iii) treating intermediate (ii) with 1,1,1-tetrachloroethane to form an intermediate (iii); wherein the amount of 1,1,1-tetrachloroethane is effective to provide a $CCl_3$ $CH_3$ to organomagnesium compound molar ratio of 0.3 to 3.0;
(iv) treating intermediate (iii) with titanium tetrachloride and removing said non-polar solvent from the slurry to form a solid catalyst precursor; wherein the amount of titanium tetrachloride is effective to provide a Ti:hydroxyl group molar ratio of greater than 1.0 to form said solid catalyst precursor; and
(v) combining said solid catalyst precursor with dimethylaluminum chloride as cocatalyst; wherein the amount of cocatalyst is effective to provide an Al:Ti molar ratio of greater than 10.

16. The catalyst composition of claim 15, wherein steps (ii), (iii) and (iv) are conducted at a temperature in the range of 40 to degrees C.

17. The catalyst composition of claim 16, wherein the non-polar solvent is a hydrocarbon which is liquid at ambient conditions.

18. The catalyst composition of claim 16, wherein the amount of $TiCl_4$ used in said step (iv) is such that the molar ratio of (Mg):(Ti) is about 0.5 to about 2.

19. The catalyst composition of claim 18, wherein the amount of $TiCl_4$ used in said step (iv) is such that the molar ratio of (Mg):(Ti) is about 0.75 to about 1.5.

20. The catalyst composition of claim 18, wherein the amount of the organomagnesium compound used in said step (ii) is such that the molar ratio of Mg:OH is about 1:1 to about 3:1.

21. The catalyst composition of claim 19, wherein the amount of the organomagnesium compound used in said step (ii) is such that the molar ratio of (Mg):(OH) is about 1.1:1 to about 2:1.

22. The catalyst composition of claim 20, wherein the amount of the organomagnesium compound used in said step (ii) is such that the molar ratio of (Mg):(OH) is about 1.2:1 to about 1.8:1.

23. The catalyst composition of claim 22, wherein the amount of the organomagnesium compound used in said step (ii) is such that the molar ratio of (Mg:OH) is about 1.4:1.

24. The catalyst composition of claim 23, wherein the silica, prior to contact thereof with the solvent in step (i), is heated at a temperature of at least about 200° C.

25. The catalyst composition of claim 23, wherein the silica is heated at a temperature of about 600° C.

26. The catalyst composition of claim 25, wherein the silica has, after heating a surface hydroxyl group concentration of about 0.7 mmol/g, a surface area of 300 $m^2$/g and a pore volume of 1.65 $cm^3$/g.

27. The catalyst composition of claim 1, wherein the organomagnesium compound of (ii) is used in an amount to provide a molar ratio of (Mg:(OH) of about 1.1:1 to about 2:1.

28. The catalyst composition of claim 15, wherein the organomagnesium compound of (ii) is used in an amount to provide a molar ratio of (Mg):(OH) of about 1.1:1 to about 2:1.

* * * * *

UNITED STATES PATENT AND TRADEMARK OFFICE
CERTIFICATE OF CORRECTION

PATENT NO. : 5,693,583
DATED : December 2, 1997
INVENTOR(S) : Robert O. Hagerty, et al.

It is certified that error appears in the above-indentified patent and that said Letters Patent is hereby corrected as shown below:

<u>Claims</u>

Claim 2, column 14, line 21, after "40 to" add --60--.

Claim 16, column 15, line 32, after "40 to" add --60--.

Signed and Sealed this

Twenty-fourth Day of February, 1998

*Attest:*

BRUCE LEHMAN

*Attesting Officer*    *Commissioner of Patents and Trademarks*